Dec. 4, 1951 — R. VOGT — 2,576,981
TWISTED WING TIP FIN FOR AIRPLANES
Filed Feb. 8, 1949 — 3 Sheets-Sheet 1

INVENTOR.
RICHARD VOGT
BY Wade Koontz
ATTORNEY and
H. H. Loesch
AGENT

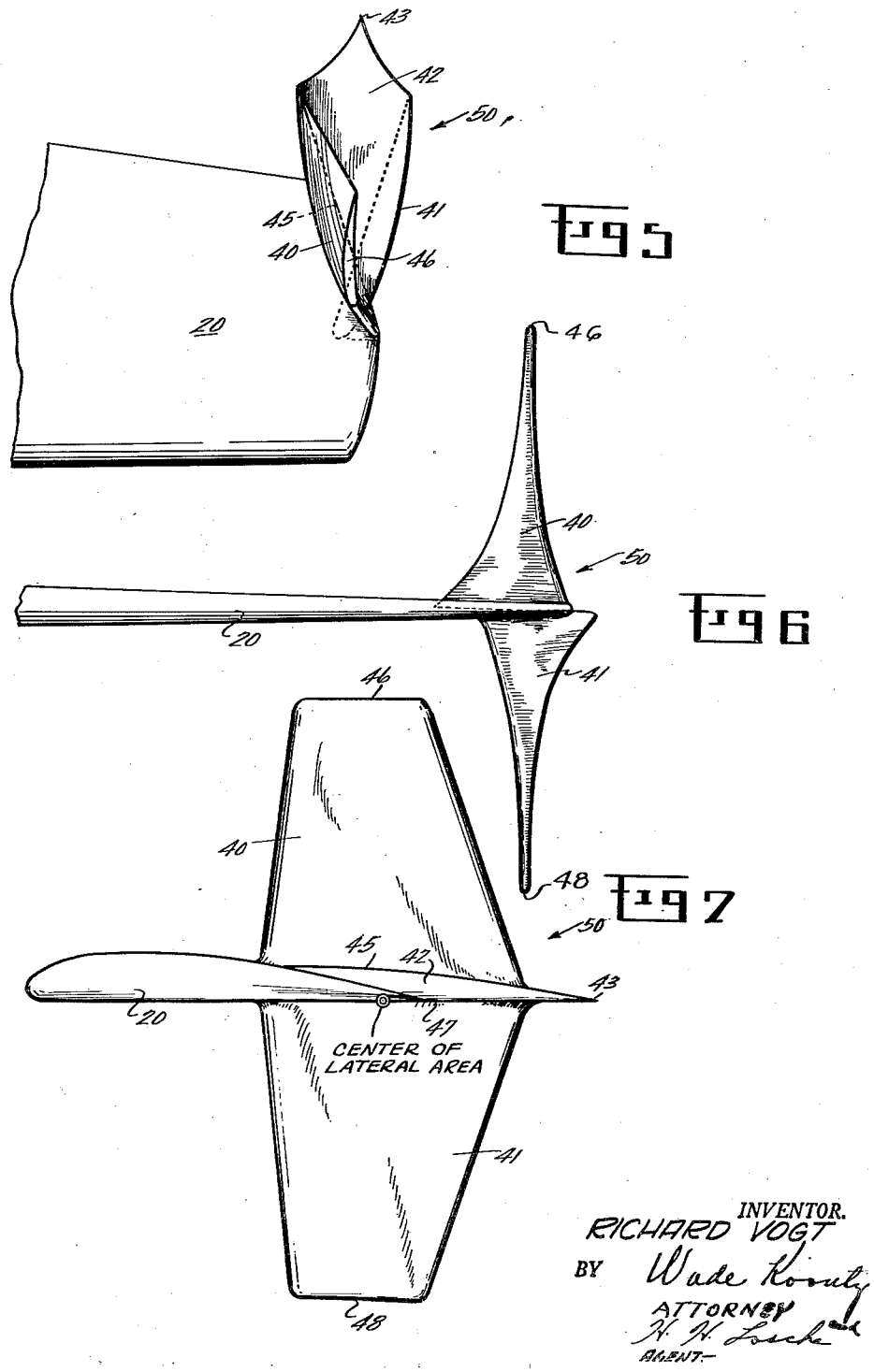

Dec. 4, 1951     R. VOGT     2,576,981
TWISTED WING TIP FIN FOR AIRPLANES
Filed Feb. 8, 1949     3 Sheets-Sheet 3
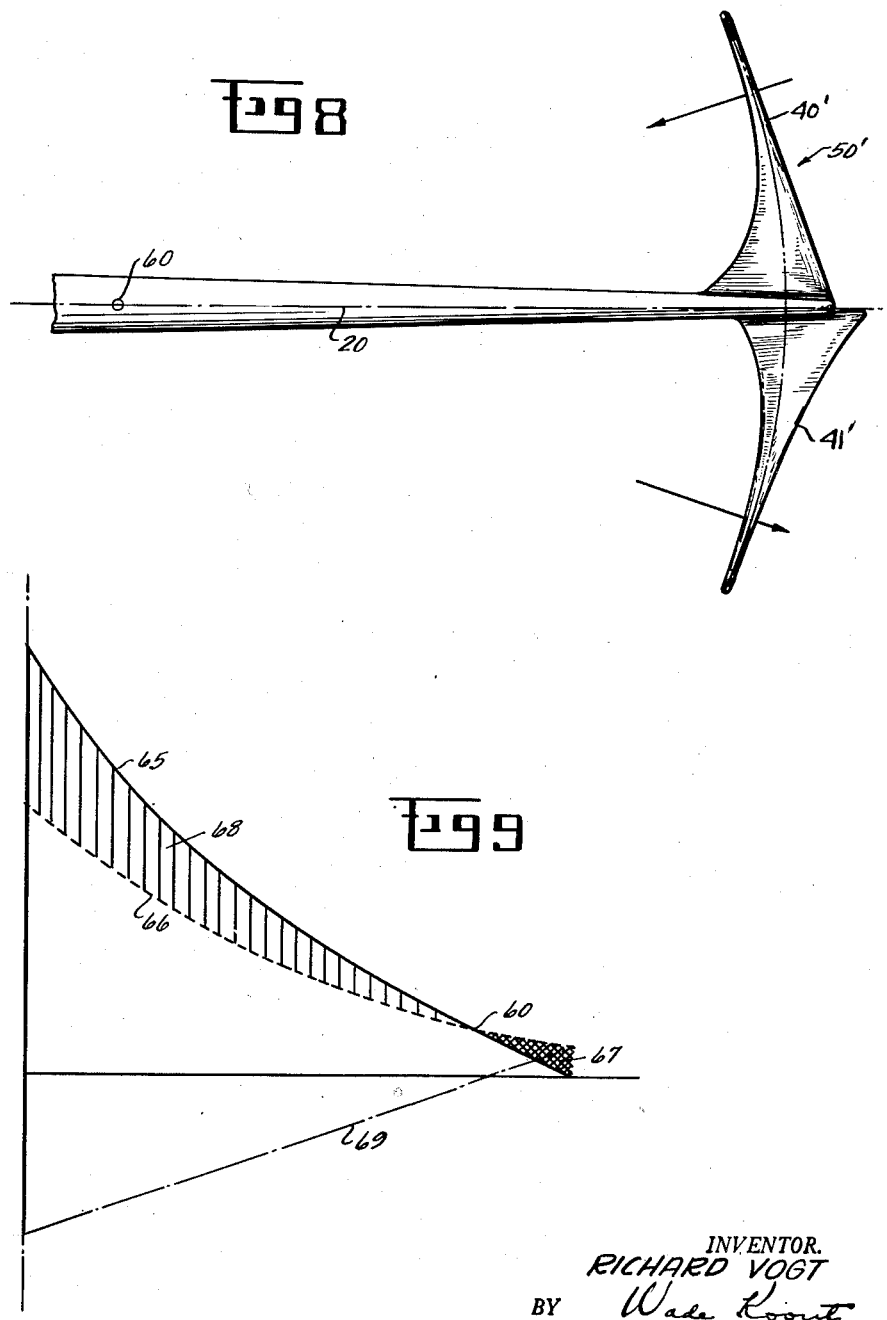
INVENTOR.
RICHARD VOGT
BY
ATTORNEY
AGENT Patented Dec. 4, 1951

2,576,981

UNITED STATES PATENT OFFICE 2,576,981

TWISTED WING TIP FIN FOR AIRPLANES

Richard Vogt, Hamburg, Germany

Application February 8, 1949, Serial No. 75,280

7 Claims. (Cl. 244—91)

(Granted under the act of March 3, 1883, as amended April 30, 1928; 370 O. G. 757)

The invention described herein may be manufactured and used by or for the United States Government for governmental purposes without payment to me of any royalty thereon.

This invention relates to wing tip fins for airplanes and more particularly to wing tip fins twisted to a favorable angle of attack for utilizing the energy of the vortex airflow at the wing tip in a manner to produce a forward thrust on the wing and by adjusting fin curvature to relieve the bending moment of the wing.

It is well known among those skilled in the art of aeronautics that a vortex airflow prevails at the wing tips of an airplane in flight. Vortex current and relative air stream combine to form a resultant spiral flow or vortex sheet in which the spiral is inclined outward and backward below the wing tip and inward and backward above the wing tip. The vortex airflow is of high velocity around the tip of the wing and reduces in velocity radially outward from the wing tip. The amount of divergence of the resultant spiral airflow from the flight direction is a maximum close to the wing tip and reduces gradually radially outward therefrom. From the wing tips, the vortex extends backward loosing its energy by friction disappearing in the airstream behind the wing. This wing tip vortex airflow has the disadvantages of increasing the drag and reducing the efficiency of the wing.

It is also known that various types of fins have been utilized on or near the wing tips to impede the leakage of air at positive pressure on the under surface of the wing to the regions of negative pressure above the wing and thus reduce the magnitude of the tip vortex with a resulting reduction in induced drag. In order to be effective, such fins or end plates must be of considerable area and the increase in profile drag in general makes the overall gain in drag reduction too small to warrant the additional structural complications.

In accordance with the present invention, the fin is utilized to extend both above and below the wing tip and is twisted to provide a favorable angle of attack with respect to the resultant airflow at the wing tip to develop lift forces on the fin having a thrust component parallel to the flight axis greater than the total drag of the fin. That is, the fin portion below the wing tip has each horizontal section positioned at a small positive angle of attack with respect to the direction of the resultant vortex airflow originating under the wing tip at that section and the fin portion above the wing tip is twisted in general slightly inward and backward to produce a slight angle of attack at each section with the vortex airflow above the wing tip at that section to produce a forward component of thrust on the wing. The fin portions are joined by a smooth unbroken surface to effect a fin with a twisted contour very similar to that of a propeller. By properly warping the fin so that each horizontal section thereof makes an angle of attack with respect to the direction of tip flow at that section substantially equal to the angle of maximum L/D for the airfoil section of the fin, the resultant forces on the upper and lower portions of the fin will lie forward of the spanwise axis of the wing and will thus have a thrust component in the plane of flight. Airplanes flying at high altitudes with high lift coefficients and having wings with low or moderate aspect ratio gain most.

It is a primary object of this invention to provide wing tip fin means capable of converting part of the energy in the tip vortices of an airplane wing into useful thrust.

It is another principal object of this invention to provide wing tip fin means capable of decreasing the bending moment on the wing.

A further object of this invention is to provide a twisted wing tip means in which the vortex airflow around the wing tip strikes the fin means at desirable angles of attack to produce a component of forward thrust on the wing and to relieve the bending moment on the wing.

Still another object of this invention is to provide a twisted fin structure for the wing tips of aircraft in which each section of the fin is twisted to have an angle of attack with respect to the wing tip vortex airflow at each corresponding section such that a forward thrust is exerted on the airplane wing, the fin structure being further laterally curved such that the vertical center line of the fin lies on a circular arc about a chordwise axis on the wing parallel to the direction of flight whereby the air load on the fin elements is effective in producing a net vertical force relieving the bending moment on the wing over the heavier loaded portion thereof.

These and other objects and advantages will become more apparent to those skilled in the art when taken in conjunction with the accompanying drawing, in which:

Fig. 5 is a view looking down on a wing tip and wing tip fin twisted in accordance with the invention;

Fig. 6 is a front view of the illustration in Fig. 5;

Fig. 7 is an end elevational view of the wing tip and fin shown in Fig. 5;

Fig. 8 illustrates a modification of a wing tip made in accordance with the invention, such as illustrated in Figs. 5 and 7, in which the fin structure is laterally curved to thereby reduce bending moments on the wing; and Fig. 9 is a graph of the bending forces along the wing in accordance with the modification in Fig. 8.

Figure 1:
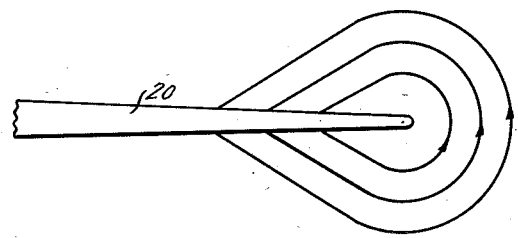
Fig. 1 shows the theoretical vortex airflow around a conventional wing tip as viewed from the leading edge.
Figure 2:
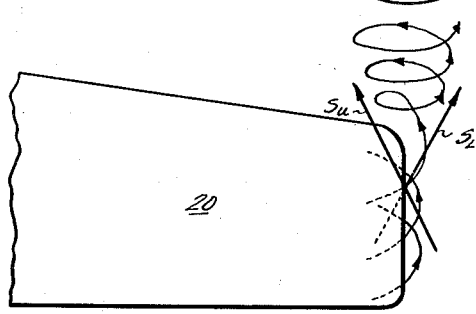
Fig. 2 shows a top plan view of one type of airplane wing with arrows showing the resultant airflow above and below the wing tip and the representative vortex airflow.

Referring now particularly to Figs. 1 and 2, there is shown a conventional wing tip 20 which, in flight, has a lower pressure above the wing than below it producing a lift. This difference of pressure across the wing causes air under the wing near the tip to seek the lower pressures above the wing producing an airflow around the wing tip as represented by the lines with arrows. The airflow around the wing tip surface is of high velocity but decreases in velocity radially outward from the wing tip until all traces of vortex airflow are spent in the airstream. Due to the forward travel of the wing, as represented in Fig. 2 of the wing travelling toward the bottom of the drawing, the airflow around the wing tip actually travels in the path of a vortex or helical spiral that disappears behind the wing tip by air resistance. The result of this wing tip vortex, as this airflow is generally referred to, produces a resultant airflow component represented by the arrow $S_L$ coming from under the wing tip and $S_U$ coming over the wing tip. (Fig. 2.)

Figure 3:
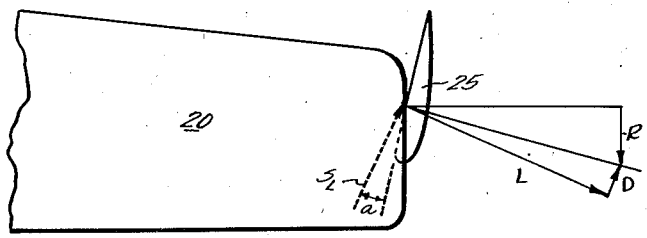
Fig. 3 shows a top plan view of a conventional wing tip with a straight fin below the wing tip in accordance with the teaching of this invention.

Referring to Fig. 3, a lower fin 25 is hung on the wing tip at an angle $a$ less than the angle of the resultant vortex airflow $S_L$ to produce an angle of attack, corresponding to the angle $a$, which produces a lift on the fin as represented by the vector L. The drag for such a fin profile is represented by the vector D providing a resultant forward of the normal to the wing chord to produce a forward thrust represented by the vector R. Since the vortex airflow begins at, or slightly ahead of, the leading edge of the wing and continues off the trailing edge of the wing, the fin 25 is positioned with its leading edge behind the leading edge of the wing with its trailing edge behind the trailing edge of the wing and with the center of lateral area of the fin structure being in the proximity of the trailing edge of the wing at the tip as indicated in Fig. 7 although the fin may be placed centrally or within the confines of the wing leading and trailing edges, where desirable. The effective area of the fin may be selected to obtain the greatest advantage of the vortex airflow without the wing being burdened by weight.

Figure 4:
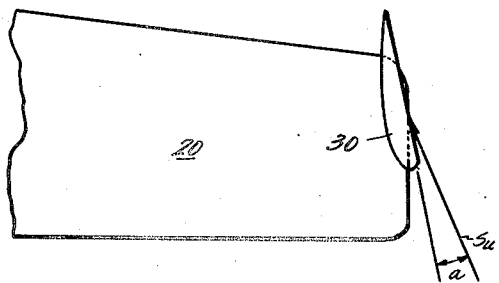
Fig. 4 is a top plan view showing a fin above the wing tip positioned in accordance with the invention.

Referring to Fig. 4, likewise, an upper fin 30 is positioned to provide an angle of attack $a$ with respect to the resultant airflow $S_U$ over the wing tip to gain a forward thrust on the wing. Like the lower fin, the upper fin 30 is positioned rearwardly from the leading edge of the wing to extend behind the trailing edge thereof. The vortex airflow that passes in front of the lower fin 25 will impinge the upper fin 30 such that substantially all the vortex airflow is utilized to an advantage.

Using both upper and lower fins on a wing tip would regain a great deal of the losses in the vortex airflow but the fins themselves would produce some vortex airflow around their tips reducing the effectiveness of the fins. In order to minimize objectionable vortex airflow over the fins, the upper and lower fins are combined into a single fin that is twisted to provide favorable angles of attack over the whole effective area below the wing and above the wing. This complete fin is shown in Figs. 5, 6 and 7 in which the wing 20 has an upper fin portion 40 and a lower fin portion 41 having their adjacent surfaces connected by a fillet surface 42 that terminates in a sharp point 43 behind the fin, although the trailing edge point 43 may be omitted without detrimental results. This trailing edge 43 of the fillet surface may take various shapes in accordance with good aerodynamical principles and design. The upper fin portion 40 has its root 45 set at an angle as the fin 30 in Fig. 4 with the top 46 positioned substantially parallel with the line of flight. The lower fin 41 has its root 47 set at an angle corresponding to the position of the fin 25 in Fig. 3 and twisted toward the lower edge 48 coming to substantial alignment with the line of flight. The fin, represented generally by the reference character 50, resembles propeller contour in that each twisted portion has the sections thereof set at an angle with respect to the direction of flight that the sections operate at an efficient angle of attack with respect to the spiral vortex airflow at each corresponding section over an optimum portion of the speed range of the aircraft.

Fig. 8 illustrates a modification of the embodiment of the invention as disclosed in Figs. 5 to 7, inclusive, in which additional advantages of reduction in the bending moment on the heavier stressed portions of the wing are obtained. In the construction shown in Fig. 8 the upper and lower fin elements 40' and 41', respectively, of the fin assembly generally indicated by 50' are twisted or pitched from the root sections to the tips so that each section is set at the proper angle of attack with respect to the relative vortex air stream at the corresponding sections in a manner similar to that previously described above with reference to the embodiment disclosed in Figs. 5 to 7, inclusive. In addition to being twisted the fins 40' and 41' are also laterally curved so as to generally lie on a circular arc about a chordwise axis 60 on the wing parallel to the direction of flight and lying inboard of the tip.

This device is so arranged that the resultant lift forces on the upper and lower fin elements will pass through the axis of fin curvature 60 as indicated by the vector representation in Figure 8. The resultant lift forces will have horizontal components lying in a spanwise vertical plane normal to the general spanwise plane of the wing which will be equal and opposite and hence cancel while the vertical components of the resultant lift forces in said vertical plane will be additive and will produce a vertical force. The net effect of all these components is the same as a vertical force acting at the axis 60 which will act downwardly and produce bending moments on the wing tending to relieve the bending moments acting on the wing due to air load.

The additive vertical components of the resultant lift forces acting on the upper and lower fin elements 60 in effect act through the axis of curvature 60 in the same manner as a concentrated load and accordingly the magnitude of the relieving bending moment created by this load increases uniformly inboard from the axis 60 to the plane of symmetry of the wing. Considering now the structure outboard from the axis 60 to the wing tip, the horizontal components of the resultant lift forces constitute a couple producing a uniformly increasing adverse bending moment from the axis 60 to the wing tip, but since the tip construction of most wings is greatly overstrength the added adverse bending stress at the tip portion of the wing is of no consequence and requires no additional structure.

The relief of the bending moments of the wing using the novel wing tip fin of this invention as compared to a wing of conventional design without fin means, is graphically shown in Fig. 9. The solid line 65 represents the original bending moment curve of a conventional wing without a wing tip fin. The broken line 66 represents graphically the bending moment curve of a wing having a wing tip fin as shown in Figs. 5, 6 and 7, and modified according to Fig. 8, in which the cross hatched area 67 represents the additional bending moment at the wing tip and the cross sectional area 68 represents the large relief of the bending moments inward from the axis 60. The dot and dash line 69 shows the large relief moment inward as by the subtraction of the moments represented by the dotted line 66 from the full line 65. This load relief makes it possible to lighten the wing structure.

The angles $S_L$ and $S_U$ of the vortex airflow vary with aircraft speed and air density. The fin 50 can therefore be twisted to produce angles of attack favorable to the cruising speed and the cruising altitude of the airplane.

While I have illustrated and described a preferred embodiment of my invention, it is to be understood that many modifications and changes may be made in the structural details and features of this invention without departing from the spirit and scope of this invention. Having described my invention, what I claim is new and what I desire to secure by Letters Patent of the United States is:

1. An aircraft wing tip construction for utilizing the vortex airflow around the wing tip to produce a forward acting thrust on the wing comprising, airfoil means supported by the wing substantially normal to the wing span and extending above and below the tip of the wing with the surface of the airfoil means twisted to provide an angle of attack with respect to the vortex airflow such that the lift force on the fin has a component producing a forward acting thrust on the wing.

2. An aircraft wing tip construction for utilizing the vortex airflow around the wing tip to produce a forward acting thrust on the wing comprising; a twisted airfoil attached to the wing tip substantially normal to the wing span and extending above and below the wing tip, the portion of the airfoil extending below the wing tip being twisted in the reverse sense from the twist in the portion thereof above the wing tip so that the angles of attack of the twisted airfoil with respect to the local vortex airflow produce lifting forces having thrust components acting forward on the wing.

3. An aircraft wing tip construction for utilizing the vortex airflow around the wing tip to produce a forward acting thrust on the wing comprising, upper and lower twisted airfoils lying generally normal to the wing span above and below the wing tip, the tip chords of each of said airfoils lying in planes substantially parallel to the line of flight, the twist of the upper airfoil being such that the trailing edge of the root section thereof lies inboard in a spanwise direction of the trailing edge of the tip chord thereof and the twist of the lower airfoil being such that the trailing edge of the root section thereof lies outboard in a spanwise direction of the trailing edge of the tip chord thereof, the angle of twist of parallel sections intermediate the tip and root chords of the respective upper and lower airfoils being such with respect to the resultant vortex airstream direction at the corresponding section so as to produce a lift force on each airfoil having a component acting forward on the wing in the direction of flight.

4. The structure as claimed in claim 3, in which the center of lateral area of the fin structure is positioned adjacent the trailing edge of the tip chord section of the wing.

5. The structure as claimed in claim 3, in which the upper and lower airfoils forming the fin structure have the root sections thereof smoothly faired into a fillet joining said airfoils into a unitary fin structure.

6. The structure as claimed in claim 3, in which the upper and lower twisted airfoils are both laterally curved about a common axis parallel with the direction of flight and lying inboard of the tip of the main wing whereby the resultant lift forces on said airfoils are on lines extending radially from the axis of curvature and the components of said lifting forces normal to the wing span act in a direction to produce bending moments relieving the bending moments on the wing due to air load.

7. An aircraft wing tip construction for utilizing the energy of the vortex airflow around a wing tip in flight to produce a forward thrust acting on the wing and to reduce the bending moments due to air load acting on the wing comprising; upper and lower fin elements of airfoil cross-section secured to the wing and lying generally in a plane normal to the plane of the wing, the leading edges of the fins being positioned adjacent the mid-point of the wing tip and the trailing edges of the fins being positioned to lie in the vortex airflow aft of the wing tip, the chords of the root sections of said upper and lower fin elements being inclined at a negative angle with respect to the direction of flight when viewed from above and below respectively with intermediate sections pitched at lesser negative angles and the tip sections of the fin elements having the chords thereof substantially parallel to the direction of flight, fillet means smoothly fairing the root sections of the fin elements and each of said fin elements being laterally curved in the same direction about an axis on the wing parallel with the direction of flight and lying inboard of the wing tip, whereby the vortex airflow about the wing tip produces resultant lift forces on each of the fin elements which intersect with the axis of lateral curvature with opposite directions of action such that the spanwise components of the resultant forces are equal and opposite while the vertical components are in the downward direction to produce bending moments on the wing opposing the bending moments due to air load on the wing and the resultant forces on the fin elements having components in the direction of flight producing a forward acting thrust on the wing.

RICHARD VOGT.

REFERENCES CITED

The following references are of record in the file of this patent:

UNITED STATES PATENTS

| Number | Name | Date |
|---|---|---|
| 1,609,978 | Wagner | Dec. 7, 1926 |
| 2,402,311 | Bissett | June 18, 1946 |